G. M. ANDERSON.
MACHINE FOR MANUFACTURING FILAMENTOUS BISCUITS.
APPLICATION FILED JULY 17, 1917.

1,334,429.

Patented Mar. 23, 1920.
4 SHEETS—SHEET 2.

Inventor
George M. Anderson.

G. M. ANDERSON.
MACHINE FOR MANUFACTURING FILAMENTOUS BISCUITS.
APPLICATION FILED JULY 17, 1917.

1,334,429.

Patented Mar. 23, 1920.

Inventor-
George M. Anderson.

G. M. ANDERSON.
MACHINE FOR MANUFACTURING FILAMENTOUS BISCUITS.
APPLICATION FILED JULY 17, 1917.

1,334,429.

Patented Mar. 23, 1920.

Inventor
George M Anderson

UNITED STATES PATENT OFFICE.

GEORGE M. ANDERSON, OF WASHINGTON, DISTRICT OF COLUMBIA, ASSIGNOR TO THE SHREDDED WHEAT COMPANY, A CORPORATION OF NEW YORK.

MACHINE FOR MANUFACTURING FILAMENTOUS BISCUITS.

1,334,429.     Specification of Letters Patent.     Patented Mar. 23, 1920.

Application filed July 17, 1917. Serial No. 181,128.

*To all whom it may concern:*

Be it known that I, GEORGE M. ANDERSON, a citizen of the United States, resident of Washington, District of Columbia, have made a certain new and useful Invention in Machines for Manufacturing Filamentous Biscuit; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
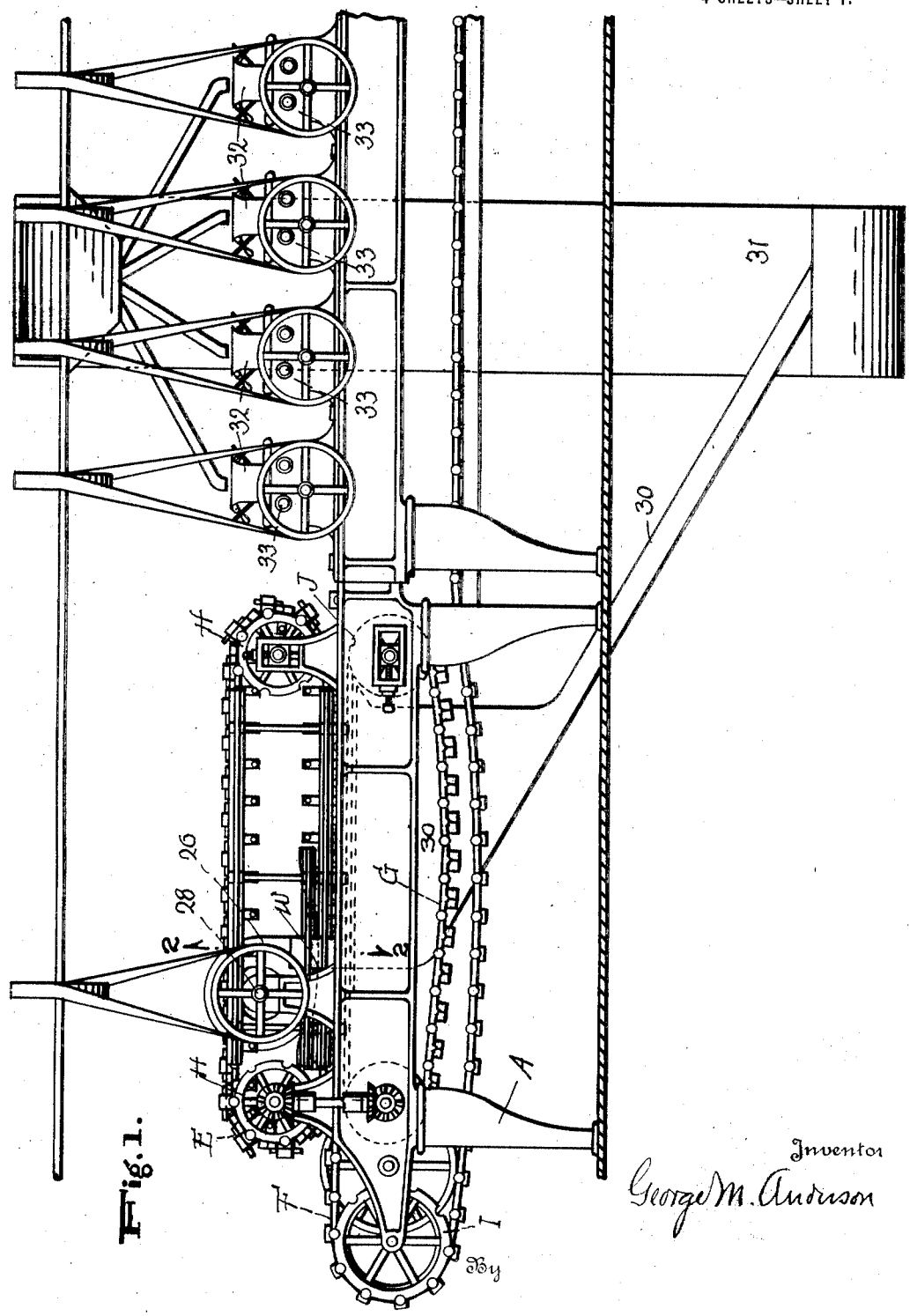
Figure 1 is a side view of the invention as applied.
Figure 2:
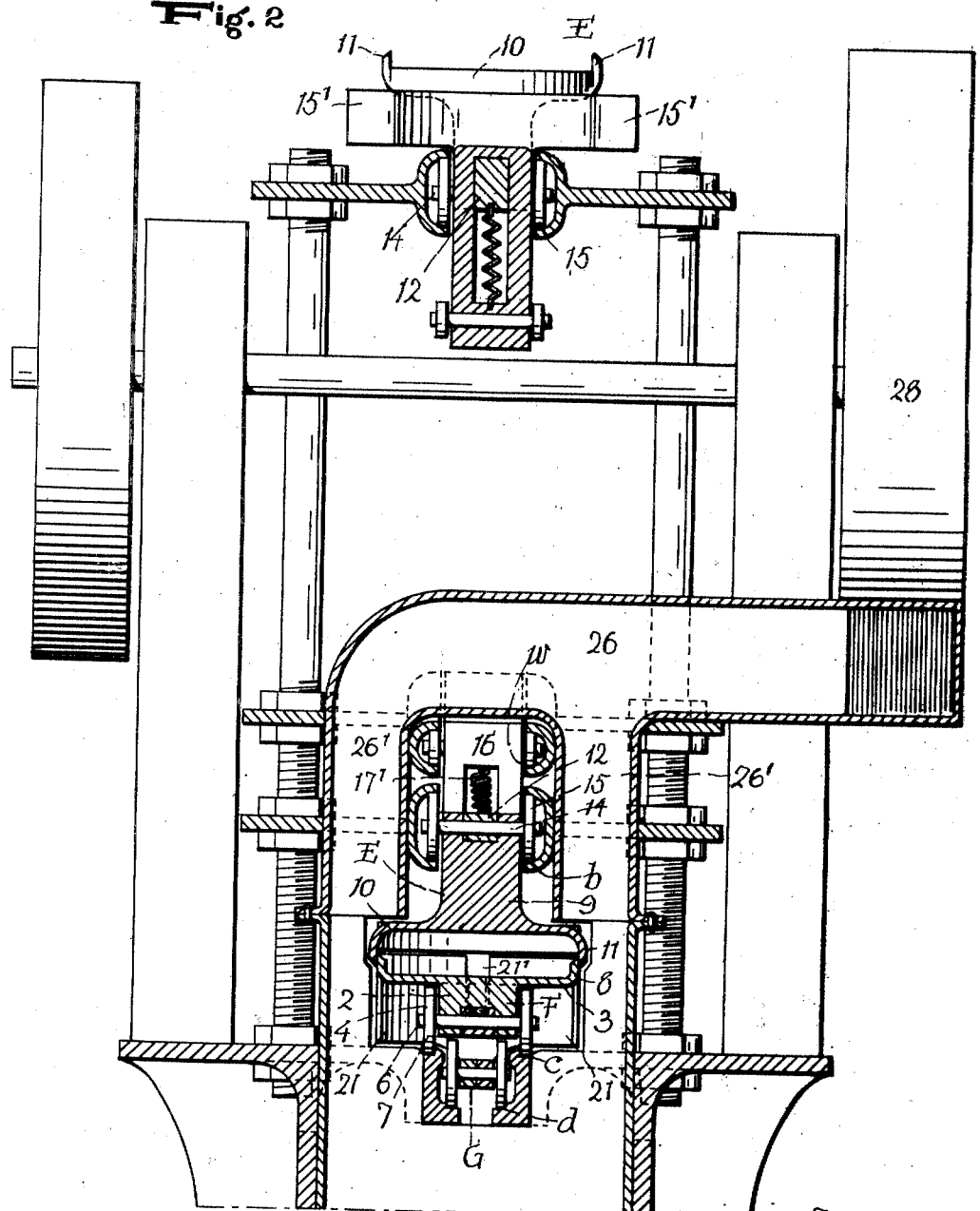
Fig. 2 is a section on the line 2—2, Fig. 1.
Figure 4:
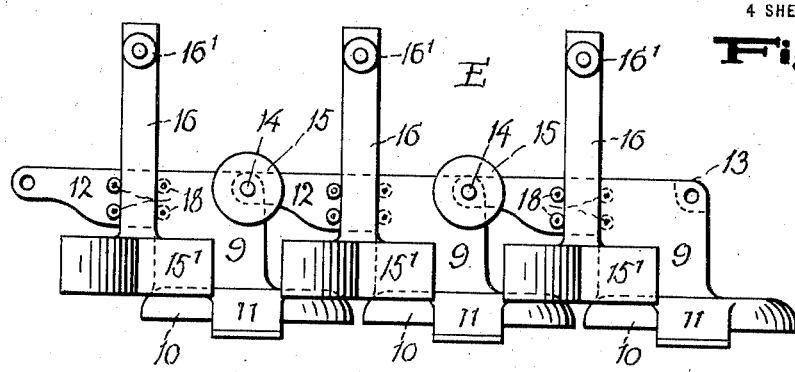
Fig. 4 is a detail side view of a section of the upper belt.
Figure 5:
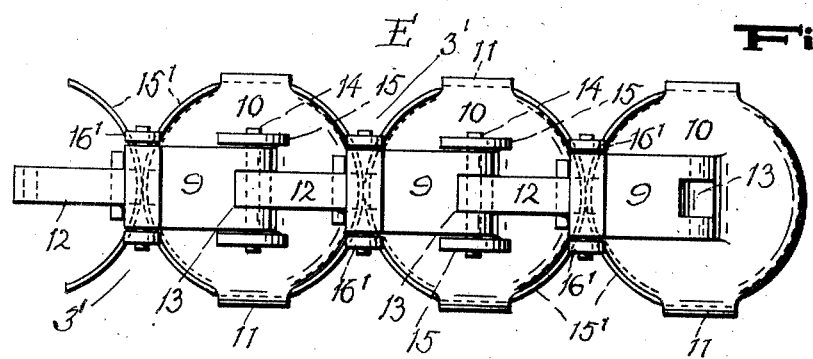
Fig. 5 is a plan view of the same.
Figure 3:
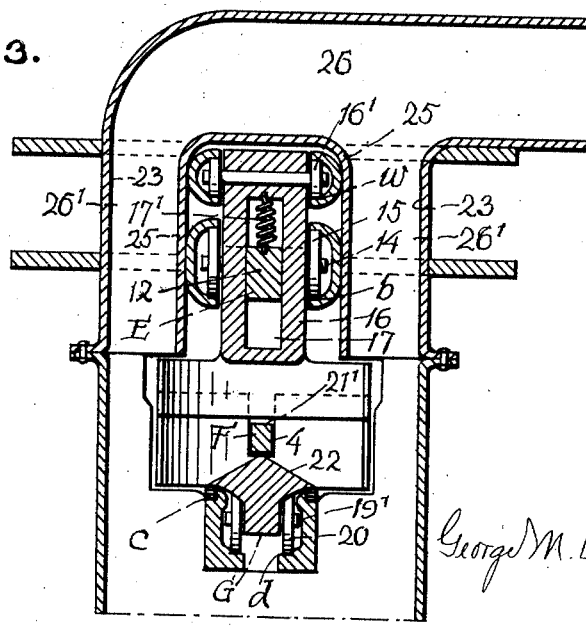
Fig. 3 is a similar view with the belts moved the length of half a link.
Figure 6:
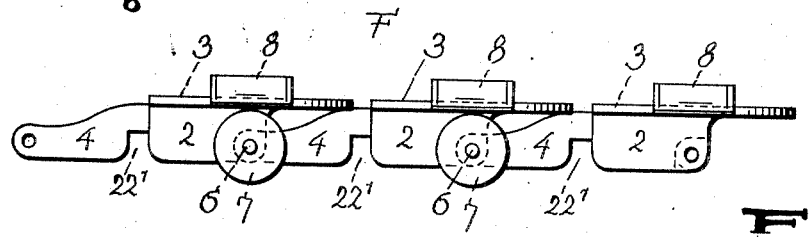
Fig. 6 is a detail side view of a section of the middle belt.
Figure 7:
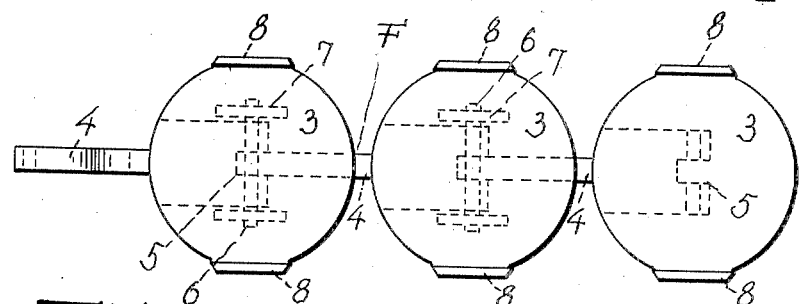
Fig. 7 is a detail plan view of the same.
Figure 8:
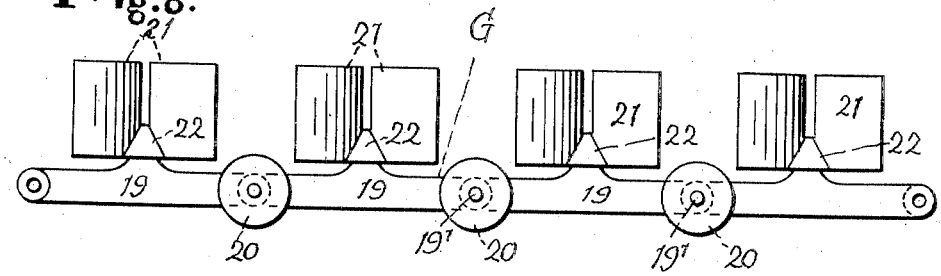
Fig. 8 is a detail side view of a section of the lower belt.
Figure 9:
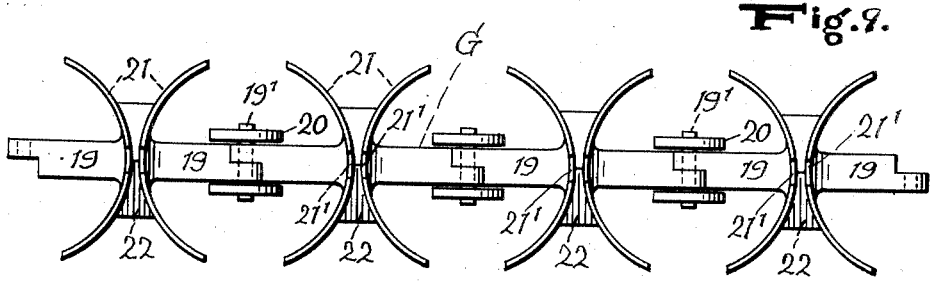
Fig. 9 is a detail plan view of the same.

The invention has relation to machines for manufacturing filamentous biscuit, wherein a continuous band of filaments is laid down from the shredding or reducing machines upon a moving carrier or belt, said band being usually transversely indented or cut in straight lines, the object of the present invention being the economical production of a round or rounded biscuit. In carrying out this object means are provided transversely dividing the band of filaments on curved or crooked lines, approximately triangular parts of the band of filamentous material being thereby cut away between the biscuit, means being provided to convey these cut-away portions of the filamentous band to the hoppers of the shredding machines, to be again used or shredded with other grain fed to said hoppers.

The invention consists in the novel construction and combinations of parts, as hereinafter set forth.

In the accompanying drawings, illustrating the invention, the letter A designates the frame of a machine for cutting the endless band of filaments into uniform sections, said machine shown and described generally in Letters Patent No. 681,656, dated August 27, 1901, and the present invention including certain modifications of this patented machine, as hereinafter explained. The frame A is provided with overlying tracks, b, c and d, upon which the endless upper, middle and lower chain belts, E, F and G, respectively travel, said belts passing over end sprocket wheels H, I and J.

The middle belt F constitutes an endless sectional pan, having between the sections or links thereof narrow intervals for passage of the upper and lower cutter blades 15' and 21. The cutter blades 21 of the lower belt pass upwardly in succession between the sections of the middle belt, entering sufficiently therebetween to lift the filamentous material somewhat and to coact with the blades of the upper cutter belt.

The links 2 of the middle belt F each carry, rigidly connected therewith, a pan or receptacle 3, and are provided respectively with a reduced extension 4, the latter engaging at one end with a central seat 5 of the adjacent link, the links being pivoted together by transverse pins 6, located centrally of the pans 3 and carrying end rollers 7, traveling upon the tracks c. Each pan 3 is substantially circular and is provided with short lateral upwardly extending flanges 8.

The links 9 of the upper belt E each carry, rigidly connected therewith, a depending cover plate 10, overlying and of similar form to that of the pan 3 corresponding thereto, said cover plate having downturned lateral flanges 11, of similar dimensions to and coöperating with the flanges 8 as hereinafter stated. Each link 9 is provided with a reduced extension 12, engaging at one end with a central seat 13 of the adjacent link, the links being pivoted together by transverse pins 14, located centrally of the cover plates and having end rollers 15, traveling upon the tracks b.

The arcuate knives 15' of the upper belt are connected in pairs, each pair to a vertical stem or shank 16, said shank provided with a horizontal slot 17, the latter being engaged by the reduced extension 12 of a link 9, there being one pair of knives to each said link. The shank 16 has vertical reciprocatory movement in a suitable guideway of the link 9, said guideway usually formed by rollers 18, carried by said link. The arcuate knives 15' are concentric with and overlie the arcuate spaces between the pans 3.

The links 19 of the lower cutter belt G are pivoted together by transverse pins 19', carrying rollers 20, traveling upon the tracks $d$, and each link carries a pair of arcuate knives 21, coöperating with the knives 15' of the upper belt in cutting the biscuit.

The cover plates 10 of the upper belt E are preferably rounded or beveled at the margins, to gather the filamentous material somewhat and give it shape as it presses thereon in its downward movement. At the adjacent edges of the sections this marginal bevel of the cover plates serves to compress the filamentous material against the rising blades of the lower knives 21, in this manner facilitating the action of the knives of the upper belt in their descent, the upper and lower knives having a shearing action.

The upper and lower cutter blades or knives will, in the cutting operation, inclose each biscuit, except at the portions of the sides bounded by the flanges 8 and 11, these flanges inclosing such portions of the biscuit, which is in this way entirely inclosed and guarded against the blast hereinafter described.

In order to effect the reciprocation of the cutter blades of the upper belt, inclined or cam tracks $w$ are provided, above the track $b$. In the operation of the machine, rollers 16' of the knife shanks of the upper belt will enter the cam tracks and, traveling downwardly therein, will depress the knives 15 to make the cut, and then raise said knives, withdrawing the same from the filamentous material. The upper knives are held normally in raised position by springs 17'.

The three endless belts travel at the same rate of speed, and are accurately formed and geared, in order that the action of the upper and lower knives shall be neat and close.

The filamentous material laid down upon the middle belt F by the reducing machines will fill the pan sections of the belt and will bridge the narrow tapering spaces 3' between the pan sections.

The tracks $c$ and $d$, whereon travel the rollers of the middle and lower belts, as also the links of these belts, are of a breadth considerably less than the width of the pans 3 and of the filamentous band from which the biscuit are cut, so that the triangular pieces cut from said band in the making of the rounded biscuit will have their descent or fall facilitated. Transverse inclined bridge blocks 22 are located between the knives 21 of the lower belt G, and are of a breadth (or length transversely) somewhat in excess of the breadth of the tracks $c$ and $d$ and the links of the belts traveling thereupon, whereby the filamentous material deposited between the pans 3 of the middle belt and cut from between the rounded biscuit, will in falling be directed outwardly and enabled to drop freely. In the rise of the lower knives 21, the bridge blocks 22 between said knives engage lower notches 22' of the reduced extensions 4 of the middle belt, said notches having rounded lower corners. In this way the lower knives are accurately guided in making the cut. The reduced extensions 4 of the links 2 of the middle belt F fit within central upper notches 21' of the knives 21 of the lower belt G.

The spaces at each side of the belts E and F are closed in at the outer sides by vertical walls 23, and the upper cutter belt and its knives are inclosed at 25, forming a blast chamber 26, located at the lower part of the cam tracks $w$ and through the branches 26' of which a blast of air is delivered by fan 28. This blast chamber extends downwardly at both sides of the overlying belts, and the breadth of the track $b$ and of the links of the belt traveling thereon being less than the width of the pans 3, the branches of the blast chamber overlie the lateral margins of the biscuit and of the filamentous band. The blast chamber 26 is suitably closed in at the ends.

Located below the blast chamber 26 is a chute 30, also suitably closed in at the sides and ends, and through which the blast of the fan will carry the triangular pieces of the filamentous band cut from between the rounded biscuit, as also all loose filaments or scrap material located upon the belts and outside the lines of the inclosed biscuit, and, being assisted by gravity, will convey these pieces and material to an elevator 31, whereon they will be deposited and carried upwardly, being delivered from said elevator to the hoppers 32 of the reducing machines 33.

I claim:

1. In a machine for manufacturing filamentous biscuit, means for reducing the material to filaments, a moving carrier upon which the filaments are deposited in a continuous band, means for cutting said band transversely to form the biscuit, and waste removing means operating simultaneously with the cutting means for directing a blast of air downwardly at each side of that portion of the band engaged by the cutting means.

2. In a machine for manufacturing filamentous biscuit, means for reducing the material to filaments, a moving carrier upon which the filaments are deposited in a continuous band, means for cutting said band transversely to form the biscuit and for covering and protecting the biscuit, and waste removing means operating simultaneously with the cutting means for directing a blast of air downwardly at each side of that portion of the band engaged by the cutting means.

3. In a machine for manufacturing filamentous biscuit, means for reducing the material to filaments, an endless carrier chain belt having pans upon which the filaments are deposited in a continuous band, an upper endless chain belt having covers for said pans, a lower endless cutter belt, upper cutters carried by the cover belt, and waste removing means operating simultaneously with the cutters for directing a blast of air downwardly at each side of that portion of the band engaged by the cutters.

4. In a machine for manufacturing filamentous biscuit, means for reducing the material to filaments, an endless carrier chain belt having pans upon which the filaments are deposited in a continuous band, an upper endless chain belt having covers for said pans, a lower endless cutter belt, upper cutters carried by said cover belt, lateral tracks for the carrier belt, the cover belt, the lower cutter belt and the upper cutters all located within the lateral bounding edges of the links of said belts, and waste removing means operating simultaneously with the cutters for directing a blast of air downwardly at each side of that portion of the band engaged by the cutters.

5. In a machine for manufacturing filamentous biscuit, means for reducing the material to filaments, an endless carrier chain belt having pans upon which the filaments are deposited in a continuous band, an endless chain belt having covers for said pans, a lower endless cutter belt, upper cutters carried by the cover belt, lateral tracks for the carrier belt, the cover belt, the lower cutter belt and the upper cutters all located within the lateral bounding edges of the links of said belts, a housing for the tracks of the cover belt and the upper cutters, the pans of the carrier belt projecting laterally over and covering the tracks thereof, and waste removing means operating simultaneously with the cutters for directing a blast of air downwardly at each side of that portion of the band engaged by the cutters.

6. In a machine for manufacturing filamentous biscuit, means for reducing the material to filaments, an endless carrier chain belt having pans upon which the filaments are deposited in a continuous band, an endless chain belt having covers for said pans, a lower endless cutter belt, upper cutters carried by the cover belt, lateral tracks for the carrier belt, the cover belt, the lower cutter belt and the upper cutters all located within the lateral bounding edges of the links of said belts, a housing for the tracks of the cover belt and the upper cutters, the pans of the carrier belt projecting laterally over and covering the main portions of the tracks thereof and of the lower cutter belt, the last named belt having inclined bridge means between the links thereof and projecting over and covering the tracks thereof and of the carrier belt at points between the links of both belts, and waste removing means operating simultaneously with the cutters for directing a blast of air downwardly between the links of the carrier belt and at each side of that portion of the filamentous band engaged by the cutters.

In testimony whereof I affix my signature in presence of two witnesses.

GEORGE M. ANDERSON.

Witnesses:
W. R. BAUM,
STUART HILDER.